United States Patent [19]

Hähnke et al.

[11] 4,445,904

[45] May 1, 1984

[54] PROCESS FOR CONTINUOUSLY DYEING IN THE GEL STATE FIBER MATERIAL OF ACRYLONITRILE POLYMERS SPUN FROM ORGANIC SOLVENTS WITH CARBINOL- OR ANHYDRO BASE OF BASIC DYE

[75] Inventors: Manfred Hähnke; Wolfgang Teige, both of Kelkheim, Fed. Rep. of Germany

[73] Assignee: Hoechst Aktiengesellschaft, Frankfurt am Main, Fed. Rep. of Germany

[21] Appl. No.: 434,374

[22] Filed: Oct. 14, 1982

[30] Foreign Application Priority Data

Oct. 16, 1981 [DE] Fed. Rep. of Germany ....... 3141082

[51] Int. Cl.³ .......................... C09B 11/10; D06P 1/41
[52] U.S. Cl. ............................................ 8/538; 8/539; 8/657; 8/927
[58] Field of Search ............................ 8/538, 539, 657

[56] References Cited

U.S. PATENT DOCUMENTS 3,787,182  1/1974  Eigenmann et al. ................ 8/538
4,020,037  4/1977  Hahnke et al. ..................... 524/110
4,059,403  11/1977  Wolf et al. .......................... 8/538
4,266,940  5/1981  Blackburn et al. ................. 8/538

FOREIGN PATENT DOCUMENTS 44059  1/1982  European Pat. Off. .
1334265  10/1973  United Kingdom .

*Primary Examiner*—A. Lionel Clingman
*Attorney, Agent, or Firm*—Curtis, Morris & Safford

[57] ABSTRACT

A process for the continuous dyeing of fiber material of one or more acid-modified polymers or copolymers of acrylonitrile in the gel state, said fiber material having been produced by wet spinning from a spinning solution containing one or more organic solvents, which process comprises dyeing the fiber material with a solution of a carbinol base or anhydro base of a carboxyl- or sulfo-free N-arylated triarylmethane dyestuff, a carboxyl- or sulfo-free N-arylated diarylindolylmethane dyestuff, a carboxyl- or sulfo-free N-arylated diaryloxazine dyestuff, a carboxyl- or sulfo-free N-arylated diarylxanthene dyestuff, or a carboxyl- or sulfo-free N-arylated diarylazine dyestuff in a dye bath containing water and the organic spinning solvent or solvents.

9 Claims, No Drawings

PROCESS FOR CONTINUOUSLY DYEING IN THE GEL STATE FIBER MATERIAL OF ACRYLONITRILE POLYMERS SPUN FROM ORGANIC SOLVENTS WITH CARBINOL- OR ANHYDRO BASE OF BASIC DYE

The present invention relates to the continuous dyeing, as part of the manufacturing process, of fiber material, such as fiber tapes or filaments, of acid-modified polymers or copolymers of acrylonitrile and which has been produced by a customary wet-spinning process from spinning solutions containing organic solvents, in the gel state using organic solutions of basic dyestuffs.

Dyeing techniques of the previously mentioned type, in which the spun product is exposed to the action of a dyeing operation after the actual fiber-forming step, have been known for a long time. They have the advantage that in the swollen and gel-like state the fiber is particularly absorptive toward dyestuffs. Owing to this remarkable property of the spun material a dyeing can hence be carried out under conditions which are considerably milder than those required for the dyeing of those fiber materials which have already been subjected to a stretch, to orient the macromolecules, and have been dried. This, however, also means that complete penetration—rather than a ring dyeing—of the fiber by the dyestuff is obtained in this way already in the course of a few seconds after the spun material has been dipped into the coagulation bath, which, after stretching and drying have been carried out, produces a dyeing which is usually more permanent and more light- and washfast and has better color yields than it is otherwise possible to obtain by conventional dyeing methods. This state of affairs can be visualized as the result of infusion into the freshly precipitated polymer mass of the dyestuff, with the assistance of the coagulation bath, which penetrate into the structure formed from the polymer and there replace the particular spinning solvent used.

Although dyeing in the gel state, i.e. virtually during fiber formation, renders a number of process stages redundant compared to the methods hitherto customary for this purpose, this novel working technique nevertheless still did not prove fully satisfactory. Attempts were accordingly made to improve the dyeability of the fiber immediately after it had been spun, be it by modifying the fiber material itself, i.e. by incorporating, by polymerization, into the fiber structure special centers having an increased absorbency for one (or even more) suitable dyestuff type(s) of specific substantivity according to the character of the modification, by finding suitable dyestuff classes which are sufficiently soluble in the coagulation bath, which may contain inorganic salts, at the temperatures possible there, or by structural modifications within the molecule of dyestuffs considered useful. Investigations of this type also had the ultimate object of providing a rapid, effective and efficient continuous dyeing process, by varying the process conditions, in particular the treatment medium.

U.S. Pat. No. 3,242,243 is thus concerned with making more precise the selection criteria of dyestuffs which, within the scope of the wet-spinning process of acrylonitrile polymers, can be used for the gel dyeing, and the check embracing, in particular, not only the influence of the spinning solvent but also the composition of the coagulation bath in respect of the applicability of different dyestuff classes. It was found in this work that the fact that the solubility of the dyestuff used in the coagulation bath is not the sole critical factor, but, in addition, the coagulating medium present in the liquid coagulation bath or the non-solvent for the spun polymer is at the same time a solvent for, or miscible with, the spinning solvent carried over in the extrusion of the fiber material, so that the spinning solvent can be removed from the coagulating or precipitating polymer, must be considered a prerequisite for an adequate dyestuff uptake to be obtained in the limited space and the limited contact time which are in practice given on a spinning line. It is assumed in respect of the dyeing process in the case of non-aqueous systems that when aliphatic hydrocarbons or other non-aqueous, readily diffusing coagulating media are used in the coagulation bath, the infusion and replacement mechanism of the organic liquid while simultaneously exhausting the dyestuff is the same as in aqueous systems, while the use of higher molecular weight substances as coagulating medium brings about merely a lower infusion into the polymeric structure formed, but that due to improved solubility conditions the dyestuff supply is available in higher concentration for the gel dyeing.

Some of the problems which still occur in this respect in the continuous dyeing of polyacrylonitrile tow in the hydrated gel state, with fibers being moved after the fiber formation with an adjustable speed through a countercurrent dyeing liquor, have been attempted to be solved in German Auslegeschrift No. 2,063,179, by adjusting the relative speed of the fibers to the dyeing liquor and the dyestuff concentration of the dyeing liquor at the point where the fibers exit from the dyeing liquor in such a way that the dyestuff concentration at the fiber exit point is approximately zero. With the aid of this procedure it was intended to remedy specifically those difficulties which arise in connection with keeping the dyestuff concentration in the dyebath constant, which, in the adverse case, results in undesirable ending. A precondition for using the countercurrent principle for dyeing is, however, that the corresponding dyestuffs are readily soluble in water.

To increase the efficiency of a liquid treatment of a polyacrylonitrile fiber tow, for example, with a dyeing liquid, measures have even been taken, according to German Offenlegungsschrift No. 2,132,030, to pass the tow during this operation through a spatially limited zone and to squeeze the heated liquor with a certain flow rate within this zone transversely through the continuously running fiber material. In this case also, the solubility of the dyestuffs used in the spinning bath and dyebath was critical for the success of this known process.

It is known that conventional basic dyestuffs, which usually feature excellent affinity toward acrylonitrile polymer and copolymer fibers, are sparingly soluble in a number of those highly polar organic solvents which, in turn, form the spinning solvent for this fiber type within the scope of the wet-spinning process. Because of this insight, the applicability of this dyestuff category is restricted in all those gel dyeing processes where the spinning process and the immediately subsequent dyeing process are carried out in a coagulation bath based on such organic solvents. However, as was found in German Offenlegungsschrift No. 2,907,986, certain modifications of the structure of the basic dyestuffs mentioned enable their solubility in the possible solvents to be improved. In addition, these modifications impart to the basic dyestuffs a genuine insolubility in water, which, in turn, has a favorable effect on the dyeings obtained with such dyestuffs in a wash process for finishing the fiber material thus dyed. German Offenlegungsschrift No. 2,907,986 introduces typical dyestuffs of basic nature and the solubility of which is advantageously effected in the abovementioned sense by their structural conditions, which are compounds of salt-like structure, corresponding to the general formula $D^{(+)}X^{(-)}$, which consist of the dyestuff cation $D^{(+)}$ which forms the chromophoric constituent and which, compared to the colorless dyestuff anion $X^{(-)}$, which is chiefly responsible for the solubility of the product, constitutes the relatively larger part of the molecule (higher cation weight). Such a dyestuff cation $D^{(+)}$ can belong to the group of the monoazo, disazo, methine, azomethine, diarylmethane, triarylmethane, oxazine, anthraquinone, naphthostyryl, quinophthalone or benzimidazole dyestuffs. The process described also includes among the dyestuffs found to be useful also the free dyestuff bases from the series of the monoazo and anthraquinone compounds, it having to be considered characteristic in the case of the last-mentioned uncharged dyestuffs that the latter, as free base, produce the same color on the polymer as analogous dyestuffs do in the form of a salt of the formula $D^{(+)}X^{(-)}$, i.e. the transition from dyestuff salt into dyestuff base does not modify the chromophoric system. However, as regards dyestuff bases in which a complete change of the chromophoric system takes place through salt formation, there is no mention in the publication concerned; in fact, according to the knowledge at the time they would have not been expected to be suitable for the gel dyeing of polyacrylonitrile filaments. In the mechanism occurring during the dyeing process with the dyestuffs of the $D^{(+)}X^{(-)}$ type here possible, only the dyestuff cation is bonded to the acrylonitrile polymer, in particular by the anionic radical which may be present due to an acidic modification of the fiber, while the dyestuff anion always remains in the dyebath. The result is, however, that in a continuous dyeing process with continual replenishment of the dyestuff the anion becomes more and more concentrated in the dyebath, with formation of the corresponding acid or of a corresponding colorless salt. This in turn has the result that when the concentration of these anions is correspondingly high in the bath the fixation of the dyestuff becomes progressively worse and more difficult and that the fiber properties also suffer. If, now, this "spoiled" dyeing liquor is replaced by fresh dyeing liquor and the "spoiled" dyeing liquor is passed to the industrially customary distillative solvent recovery, a large amount of unconsumed dyestuff is thus lost in the recovery step as a result of the dyestuff fixation in the polymer which is only moderate when dyeing from used dyebaths. In addition, the harmful influence of the dyestuff anion gives rise to severe corrosion phenomena in the recovery plant, in particular because the easily accessible and hence most widely used anions are the chloride ion and the chlorozincate ion, which both have a severely corroding action. Furthermore, in the case of certain anions, such as, for example, the methosulfate ion, decomposition products are produced in the course of the recycling, if the stress and strain imposed by the distillation is severe, so that the distillate is contaminated with recovered solvent. Moreover, undesirable precipitations can occur in the dyebath when cationic dyestuffs of different salt-like construction are used together, due to a possible, mutual exchange of anions. A number of such dyestuff anions which are otherwise interesting and inexpensive are unacceptable in practice because of the corrosion problems encountered and because of incompatibility phenomena when different dyestuffs are combined.

The object of the present invention is then to make available the previously discussed process principle for the continuous dyeing of acrylonitrile polymers also for other derivatives from the series of the basic dyestuffs while retaining its simplicity, with the object being in particular to eliminate the problems pointed out in connection with the gel dyeing, to remedy the defects described and to improve the fixation properties which result in existing dyeings but are not adequate.

This object is achieved according to the invention by dyeing the fiber material of acrylic polymers more closely defined at the outset and which is present in the gel state with solutions of the carbinol bases or anhydro bases from the series of the carboxyl- or sulfo-free, N-arylated triarylmethane, diarylindolylmethane, oxazine, xanthene or azine dyestuffs in a dyebath containing the organic spinning solvent and water.

These dyestuff bases are advantageously those which contain one or more, preferably 1 to 4, arylamino groups. The aryl radical in these arylamino groups can have nonionic groups. Arylamino groups are, in particular, secondary phenylamino and naphthylamino groups optionally ring-substituted by lower alkyl, lower alkoxy, preferably methyl or methoxy groups and/or chlorine or bromine atoms.

Those N-arylated carbinol bases or anhydro bases are particularly advantageously suitable for use in the process according to the invention which have the following general formulae:

Triarylmethane series

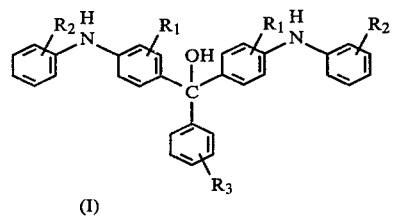

(I)

or

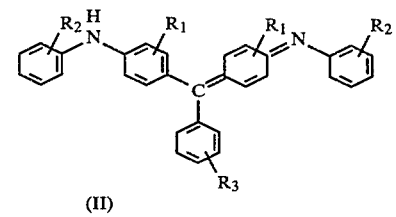

(II)

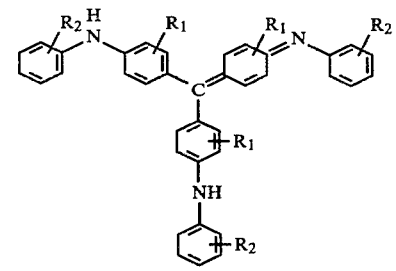

(IV)

-continued

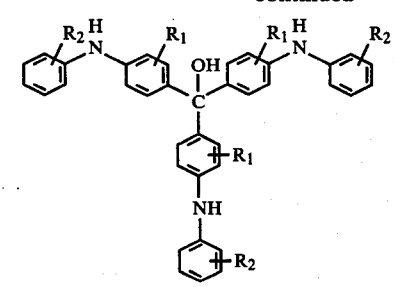

(III)

Diarylindolylmethane series

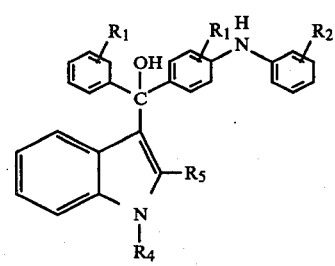

(V)

or

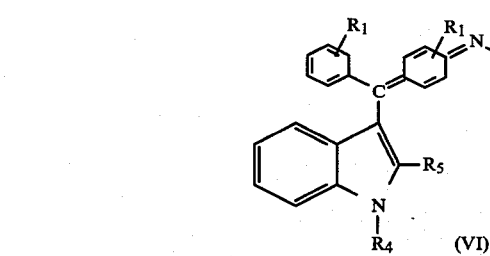

(VI)

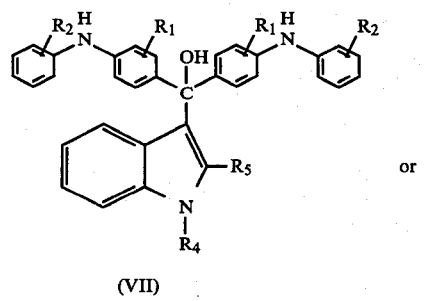

(VII)

or

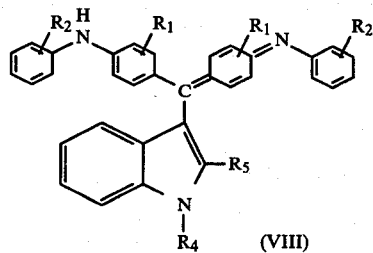

(VIII)

Xanthene series

-continued

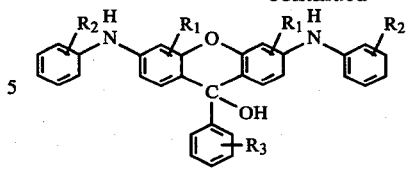

(IX)

or

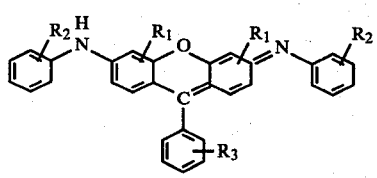

(X)

Oxazine series

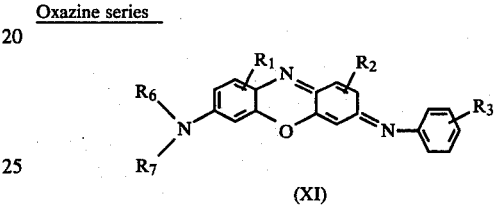

(XI)

Azine series

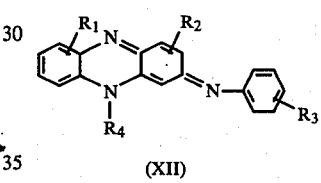

(XII)

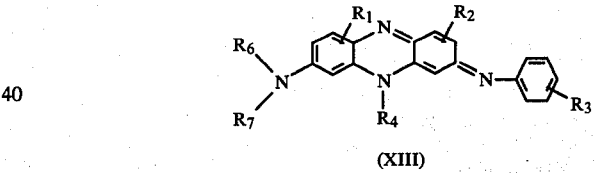

(XIII)

In these general formulae (I) to (XIII) shown above, $R_1$, $R_2$ and $R_3$ each denote a hydrogen atom or a halogen atom (such as fluorine, chlorine or bromine), a lower alkyl group having 1 to 3 C atoms (such as methyl or ethyl) optionally having a nonionic substituent, or a lower alkoxy group having 1 to 3 C atoms (such as methoxy or ethoxy), and $R_1$, $R_2$ and $R_3$ are identical or different, $R_3$ can additionally represent an amino group in p-position relative to the central carbon atom, and $R_1$ and $R_2$ can also be contained twice on the respective benzene ring or both together as well as the respective benzene ring can be bonded to one another with ring closure and form a naphthalene radical and then also have on the fused-on benzene ring nonionic substituents, such as the phenylamino group; $R_4$ denotes a hydrogen atom, a lower alkyl group having 1 to 6 C atoms or an aryl radical, such as a phenyl or naphthyl radical optionally substituted by halogen atoms (such as chlorine), lower alkyl groups (such as methyl) or lower alkoxy groups; $R_5$ denotes a hydrogen atom, a lower alkyl group having 1 to 4 C atoms (such as methyl) or an aryl radical (such as phenyl); $R_6$ and $R_7$ each denote a hydrogen atom, a lower alkyl group having 1 to 6 C atoms (such as methyl or ethyl) and being optionally substituted by nonionic substituents (such as chlorine) or an aryl radical (such as phenyl) which can be optionally monosubstituted or polysubstituted by nonionic substituents (such as chlorine) or an aralkyl radical (such as benzyl or phenethyl).

The carbinol or anhydro bases used according to the invention, of basic dyestuffs of the previously explained type, can be prepared in a known manner, for example from the corresponding dyestuff salts by reaction with alkalis, such as, for example, sodium hydroxide solution, potassium hydroxide solution, sodium carbonate or ammonia or other, relatively strong organic amines. However, some of the dyestuffs to be used according to the new process are already obtained in the synthesis in the form of their dyestuff base. Owing to their insolubility in water, they can be isolated comparatively readily from the reaction solutions.

The present invention relates to a process for dyeing in the gel state fiber material, such as fiber tapes or filaments, of acid-modified acrylonitrile polymers which have been manufactured by a customary wet-spinning process. Owing to the fact that according to the invention the spun polymers of acrylonitrile are dyed from solvent-containing liquors, wash processes in which the filaments are freed from the solvent used in preparing the spinning solution become superfluous, i.e. the dyeing operation can be carried out without modifying the machine equipment necessary, and customary in practice, for spinning and finishing undyed filaments. Those dyebaths are suitable within the scope of the process claimed, and with the use of the basic dyestuff derivatives termed useful in the above explanations, which are composed of a mixture of 30 to 80% by weight, preferably 40 to 60% by weight, of the organic solvent also used for preparing the spinning solution (i.e. used for spinning the polymer) and water as well as the carbinol or anhydrobase proposed according to the invention. In principle the process is carried out without the addition of an acid, but to maintain the pH at a constant value close to neutral a small amount of an organic carboxylic acid can be added to the treatment liquor.

For dyeing, the unstretched fibers or filaments are treated in the present case, without having been dried, with the dyestuffs dissolved in the solvent-containing dyeing medium at temperatures between 10° and 100° C., preferably between 20° and 80° C. The dyeing time is in general between 0.5 and 20 seconds, preferably between 2 and 20 seconds. The dyeing time indicated corresponds to the contact time (the dwell time) of the polymer with the dyestuff solution after spinning.

The dyeing operation itself is carried out continuously, according to the process, as part of the manufacturing process of the fibers, tapes and filaments, i.e. as long as the freshly spun acrylonitrile polymers are in a gel-like form. The dyeing operation can be carried out during or shortly after the coagulation step of the polymer. This thus means that the actual dyebath can be embodied by the coagulation bath or also a subsequent wet-stretching bath or also a relaxation bath.

The dyebath within the meaning of the previously stated possibility for variation can be a stationary medium through which the spun material is passed after leaving the die and the coagulation which then takes place. During the dyeing, when the fiber material passes through continuously, the composition of the dyebath is always maintained constant by adding, in a suitable manner, for example a solution of the dyestuff at a concentration which is such that the dyestuff taken up by the fiber tapes or the filaments is continuously replaced. To enable the dyeing liquor to be optimally exploited, the dyeing liquor can also be advantageously passed in countercurrent to the transport direction of the fibers or also in transverse current through the running polymer tow. These two latter cases produce a particularly high fixation yield in the polymer of the carbinol or anhydro bases used according to the invention, so that the dyebath which is largely exhausted from dyestuff, and only still contains water and solvent, can be passed directly to the distillative solvent recovery.

By means of steam or hot air, and under conditions customary in practice, the dyed fiber tapes or filaments are then heat-set, stretched, soft-finished and, if appropriate, dried while allowing shrinkage, crimped and laid into cartons. However, according to the process it is also possible to carry out the stretching of the extruded polymer in the dyeing step itself.

Substrates to be spun which are suitable for use in the process claimed are, in addition to the polymers of acrylonitrile, copolymers of acrylonitrile with other vinyl compounds, such as, for example, vinylidene cyanide, vinylidene chloride, vinyl chloride, vinyl fluoride, vinyl acetate, vinyl propionate, vinylpyridine, vinylimidazole, vinylpyrrolidone, vinylethanol, acrylic acid, methacrylic acid, acrylates, methacrylates, acrylamides or methacrylamides, and these copolymers contain at least 50% by weight, preferably at least 85% by weight, of acrylonitrile units. The acrylonitrile homopolymers or copolymers used are always acid-modified; they contain at least one acidic function, such as, for example, sulfo or sulfato groups, which are in each case introduced by means of a catalyst into the end of polymer chains, or in the form of comonomers containing acidic groups, such as, for example, acrylic acid, itaconic acid, vinylsulfonic acid, styrenesulfonic acid, allylsulfonic acid, methallylsulfonic acid, vinyloxyarenesulfonic acid, allyloxyarenesulfonic acid, methallyloxyarenesulfonic acid or acryloxyalkoxyarenesulfonic acid, incorporated by polymerization.

According to the invention, any acrylonitrile polymer which contains acidic groups capable of bonding the dyestuff bases used is thus suitable. Acidic groups of this type are present in the spun material in amounts between 10 and 150 milliequivalent per kg of polymer, preferably between 20 and 80 milliequivalent per kg of polymer.

Organic solvents contained in the dyebaths used according to the invention belong to the group of polar aprotic compounds which are miscible with water in all proportions. They are likewise also the solvents used for preparing the spinning solution of the polymer. These organic liquids, which are suitable for the spinning process as well as the subsequent dyeing operation, include, for example, dimethylformamide, N-methylpyrrolid-2-one, β-butyrolactone, tetramethylene sulfone, acetone, dimethylacetamide, dimethyl sulfoxide or ethylene carbonate.

The carbinol or anhydro bases which can be used in the process claimed are highly soluble, even at room temperature, in the coagulation or wet-stretching baths containing the organic spinning solvent, so that these baths can be used as the actual dyeing medium. This solubility is higher, the higher the solvent content in the coagulation or wet-stretching bath, and the solubility of the dyestuff bases can be further considerably increased by increasing the temperature. Accordingly, the concentration of the dyestuff bases in the dyeing liquor can advantageously be between almost 0 and about 20% by weight, preferably between almost 0 and about 5% by weight. However, the dyestuff bases can also be added to the dyebath in the form of a concentrated solution in an organic solvent other than, for example, the particular spinning solvent and can thus be used for strengthening the liquor which has become lean in dyestuff.

The carbinol or anhydro bases used according to the invention do not at first and by themselves have dyestuff character. On treating fibrous substances of synthetic nature (without special modification) under the conditions hitherto customary, they produce in all cases a hue which differs from the hue the corresponding dyestuff present in salt form normally has, and only a low tinctorial strength. Only the reaction with the anionic groups of the polymer convert the dyestuff base into the corresponding dyestuff salt, i.e. the complete dyestuff is formed.

The dyeings obtained on this basis according to the invention by means of N-arylated carbinol or anhydro bases of basic dyestuffs on acid-modified polyacrylonitrile polymers display an extremely high tinctorial strength and brilliant shades. The fastness properties achieved with these dyeings, such as light, water, perspiration, dry cleaning and rubbing fastness, are remarkably high. The improved light fastness of fibers dyed in accordance with the process claimed deserves a particular mention, being markedly higher than in the case of dyeings with the corresponding non-N-arylated compounds. Materials dyed with the dyestuff bases used according to the invention also have wet fastness properties which are superior to those of those dyeings prepared by means of comparable non-N-arylated compounds.

The N-arylated carbinol and anhydro bases of basic dyestuffs are chemically stable and readily isolated as such, while most representatives of such non-N-arylated compounds are found to be unstable. In addition, a very predominant majority of the anion-free dyestuff bases which can be prepared in stable form have a solubility in water which is so low that use in the customary polyacrylonitrile gel dyeing, which takes place from an aqueous bath, cannot be contemplated. Conversely, this behavior in turn has the consequence that in the case of N-arylated carbinol and anhydro bases virtually no bleeding is caused in the wash and soft-finish treatment which follows on the dyeing operation.

The special bonding mechanism between dyestuff base and acid-modified polymer, in accordance with the present invention, thus does not introduce any foreign anions into the polyacrylonitrile. However, owing to the absence of anions there is no risk in the process claimed that the anionic constituents of the dyestuff, which are not exploited in the dyeing, become concentrated in the dyebath in an undesirable manner and thus lead to problems—as is the case in convenient dyeing methods based on dyestuff salts. Finally, a further advantage results from this state of affairs, namely that when a mixture of two or more of the explained carbinol bases or anhydro bases, with one another or among one another, is used a mutual precipitation cannot arise, and unrestricted compatibility thus exists in the process according to the invention. This possibility also applies to the use of carbinol or anhydro bases of the type according to the invention conjointly with free dyestuff bases of different structures.

The examples which follow serve to illustrate the invention. The parts and percentage data indicated therein are parts by weight and percentages by weight, unless otherwise stated.

EXAMPLE 1

An acrylonitrile copolymer of 94% of acrylonitrile, 5% of methyl acrylate and 1% of Na methallylsulfonate was wet-spun in the form of a 28% strength spinning solution in dimethylformamide under standard conditions at 80° C. through a 100 hole spinneret having a hole diameter of 80 μm, and a coagulation bath (dyebath) was used, the temperature of which was 50° C. and which was composed of 50% of dimethylformamide, 48% of water and 2% of the carbinol base of a triphenylmethane dyestuff of the following structure

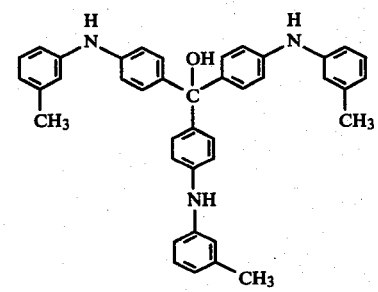

(the dyestuff base was dissolved in this liquor) and the pH value of which was maintained at 7 by the addition of acetic acid. The fiber tow thus produced was led out of this bath after a contact time (dyeing time) of 5 seconds, and the dyed fiber material was then finished as customary by stretching, washing, steaming, soft-finishing, drying, crimping and cutting.

A clear blue dyeing having excellent fastness properties was obtained on the material.

EXAMPLE 2

The same spinning solution as in Example 1 was used for producing the fiber tow, but the polymer was spun into a coagulation bath (dyebath) which was composed of 50% of dimethylformamide, 49.9% of water and 0.1% of the carbinol base used for dyeing in Example 1, and this coagulation bath was moved in such a way in countercurrent to the running direction of the fiber tow formed that, while further water was being added, the ratio of dimethylformamide and water in the dyeing liquor remained constant. The result was that a dimethylformamide/water mixture free of the dyestuff base left the coagulation bath at the entry point of the fiber tow into the coagulation bath. A clear blue dyeing having excellent fastness properties was likewise obtained in this way.

EXAMPLE 3

The dyeing described in Example 1 was carried out, not in the coagulation bath, but at 80° C. and with retention of the bath composition indicated in Example 1 in an immediately subsequent wet-stretching part of the spinning line, and the spun fibers were stretched to 200% of their starting length and the dyestuff liquor was passed transversely through the fiber tow, with the result that a blue dyeing having high fastness properties was likewise obtained.

TABLED EXAMPLES 4 TO 30

The following carbinol or anhydro bases, shown by formulae, of basic dyestuffs were used equally successfully, while retaining otherwise identical conditions, for dyeing the spun material, in place of the carbinol base used in Examples 1 to 30 above:

| Example | Formula | Shade of dyeing |
|---|---|---|
| 4 | [structure] | brilliant blue |
| 5 | [structure] | brilliant blueish violet |
| 6 | [structure] | brilliant violet |
| 7 | [structure] | brilliant neutral blue |

-continued

| Example | Formula | Shade of dyeing |
|---|---|---|
| 8 | | blueish green |
| 9 | | green |
| 10 | | reddish blue |
| 11 | | green |
| 12 | | green |

-continued

| Example | Formula | Shade of dyeing |
|---|---|---|
| 13 | | blue |
| 14 | | blueish violet |
| 15 | | dull violet |
| 16 | | brilliant blueish red |
| 17 | | brilliant blueish red |
| 18 | | reddish violet |

-continued

| Example | Formula | Shade of dyeing |
|---|---|---|
| 19 | | greenish blue |
| 20 | | blue |
| 21 | | greenish blue |
| 22 | | blue |
| 23 | | blue |
| 24 | | blue |
| 25 | | dark blue |
| 26 | | greenish blue |

| Example | Formula | Shade of dyeing |
|---|---|---|
| 27 | (H5C2)2N–C6H3–O–C6H3=N–... =N–C6H4–OC2H5 | blue-green |
| 28 | naphthyl-N=... with N-CH3, =N-phenyl | dark blue |
| 29 | H2N-phenyl-N=...-NH-phenyl, N-phenyl, =N-phenyl | blue |
| 30 | (ClH4C2)2N-phenyl-N=...=N-phenyl, N-(2-CH3-phenyl) | blue |

EXAMPLE 31

All measures for dyeing were carried out as in Example 1, but at this point a coagulation bath composed, in addition to the dyestuff quantity indicated there, from a mixture of
55 parts of dimethylacetamide and
45 parts of water
at a temperature of 50° C., and an acceptable blue dyeing was obtained in the same way. The spinning solvent was in this case dimethylacetamide.

EXAMPLE 32

The dyeing was carried out as in Example 1, but a temperature of 40° C. and a coagulation bath containing in addition to the dyestuff quantity prescribed there, a mixture of
60 parts of dimethyl sulfoxide and
40 parts of water
was used, and acceptably dyed fiber material having excellent fastness properties was likewise obtained. The spinning solvent was in this case dimethyl sulfoxide.

EXAMPLE 33

The dyeing was prepared analogously to Example 1, but a coagulation bath composed of the dyestuff quantity indicated there and of a mixture of
60 parts of dimethylformamide and
40 parts of water
was used here at a temperature of 28° C. After the further treatment steps had been carried out, a dyeing result was obtained which corresponded to Example 1.

EXAMPLE 34

The dyeing was carried out as in Example 1, but a polymer mixture of 90 parts of polyacrylonitrile (containing 1% of polymerized vinylsulfonic acid) and 10 parts of polymethyl methacrylate was processed to give a spinning solution of
20 parts of the polymer mixture and
80 parts of dimethylformamide.
The subsequent measures in the coagulation bath were carried out analogously.

EXAMPLE 35

The measures for obtaining the dyeing were the same as used in Example 1, but at this point a copolymer obtained from
88 parts of acrylonitrile,
7 parts of vinyl acetate and
5 parts of acrylic acid
was used. The working instructions mentioned there remained unchanged in other respects.

EXAMPLE 36

The dyeing was carried out as in Example 1, but the coagulation bath used had the following composition:

50 parts of dimethylformamide,
47 parts of water,
2 parts of a xanthene compound of the formula

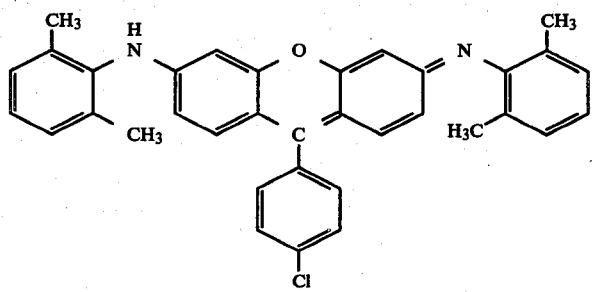

and 1 part of a diphenylinodolylmethane compound of the formula

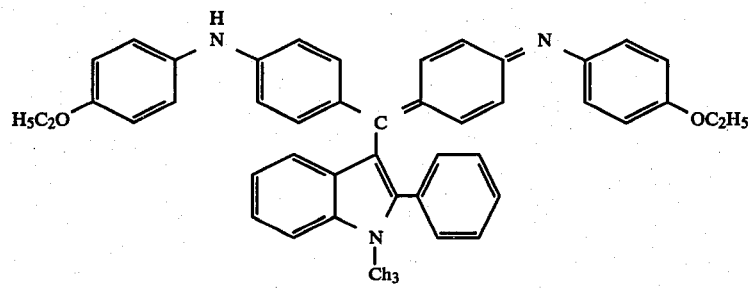

No changes were made in respect of the remaining treatment steps.

The spun material thus produced was dyed in a deep blueish red shade having excellent fastness properties.

50 parts of dimethylacetamide,
49.5 parts of water and
0.5 part of a xanthene compound of the following structure

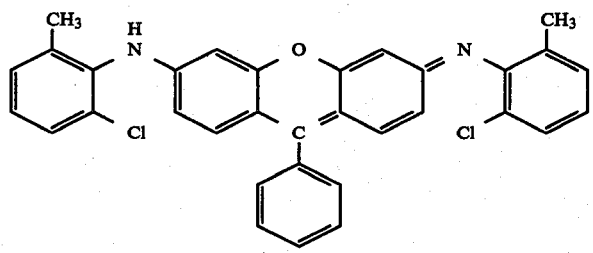

and the remaining instructions of Example 1 were followed.

The result was a brilliant red dyeing of the polymer with excellent fastness properties.

EXAMPLE 37

The dyeing was produced as in Example 1, but in this case the following coagulation bath was used:

50 parts of dimethylformamide,

EXAMPLE 38

The dyeing was repeated as in Example 1, but the coagulation bath used here had the following composition:

50 parts of dimethylformamide,
48 parts of water,
0.5 part of a xanthene compound of the formula

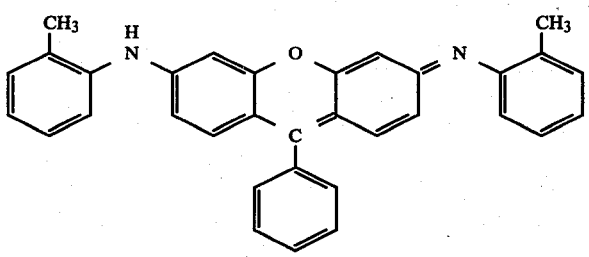

and 1.5 parts of triphenylmethane compound of the formula

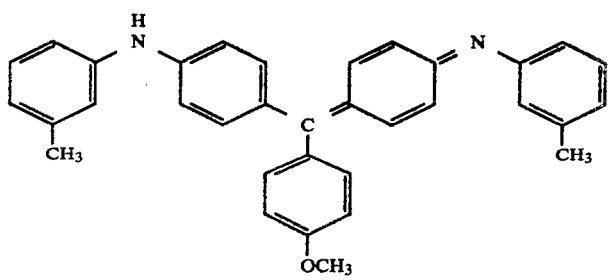

EXAMPLE 39

An acrylonitrile copolymer prepared from 50 parts of acrylonitrile, 46 parts of vinylidene chloride and 4 parts of Na methallyl-sulfonate was dissolved in 25% strength in dimethylacetamide and forced through spinnerets into a coagulation bath of the following composition:
55 parts of dimethylformamide and
45 parts of water.
The coagulation temperature for this example was 50° C.

After the coagulation of the polymer, the gel tow was stretched to 200% its starting length at a temperature of about 95° C. in a stretching bath of the following composition:
56 parts of dimethylacetamide,
40 parts of water and
4 parts of an azine compound of the formula

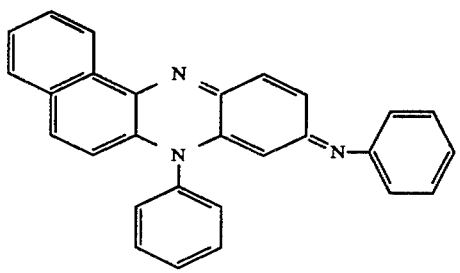

After the further measures for finishing the dyeing had been carried out, a dull brown shade having excellent fastness properties was obtained on the fiber material.

and the pH value of this liquor was maintained at 7 by the addition of acetic acid. The fiber tow thus dyed was then finished in a customary manner by further stretching, washing, steaming, soft-finishing, drying, crimping and cutting or breaking.

A deep navy dyeing having excellent fastness properties was obtained on the material.

We claim:

1. A process for the continuous dyeing of fiber material of one or more acid-modified polymers or copolymers of acrylonitrile in the gel state, said fiber material having been produced by wet spinning from a spinning solution containing one or more organic solvents, which process comprises dyeing the fiber material with a solution of a carbinol base or anhydro base of a carboxyl- or sulfo-free N-arylated triarylmethane dyestuff, a carboxyl- or sulfo-free N-arylated diarylindolylmethane dyestuff, a carboxyl- or sulfo-free N-arylated oxazine dyestuff, a carboxyl- or sulfo-free N-arylated xanthene dyestuff, or a carboxyl- or sulfo-free N-arylated azine dyestuff in a dye bath containing water and the organic spinning solvent or solvents.

2. A process as claimed in claim 1, wherein the dyestuff base contains from 1 to 4 arylamino groups, the aryl moieties of said groups being unsubstituted or substituted by one or more nonionic groups.

3. A process as claimed in claim 1, wherein the dyestuff base is a triarylmethane compound of the formula

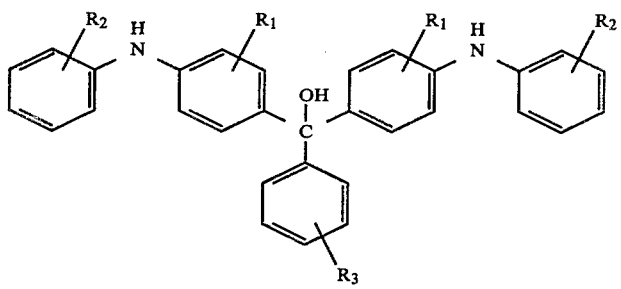

or of the formula

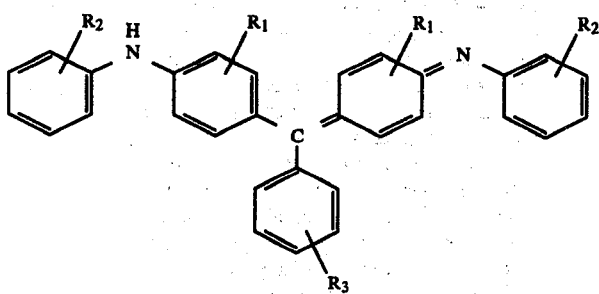

or of the formula

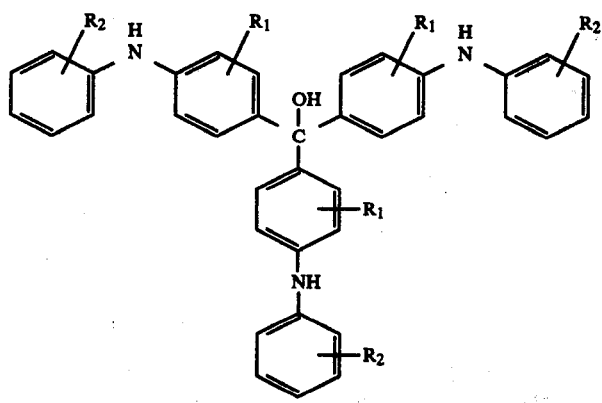

or of the formula

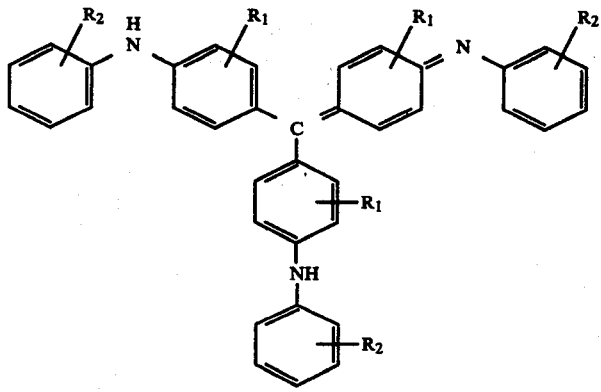

in each of which $R_1$, $R_2$ and $R_3$ are the same or not all the same and each is hydrogen, halogen, alkyl of from 1 to 3 carbon atoms, substituted alkyl of from 1 to 3 carbon atoms, alkoxy of from 1 to 3 carbon atoms or substituted alkoxy of from 1 to 3 carbon atoms, or $R_3$ is amino in the p-position relative to the central carbon atom, or one or both of $R_1$ and $R_2$ are substituted twice into one or more of the benzene rings to which they are linked, or said two substituents in any one or more benzene rings together with their respective ring are bonded to one another to form a naphthalene radical or substituted naphthalene radical.

4. The process as claimed in claim 1, wherein the dyestuff base is a diarylindolylmethane compound of the formula

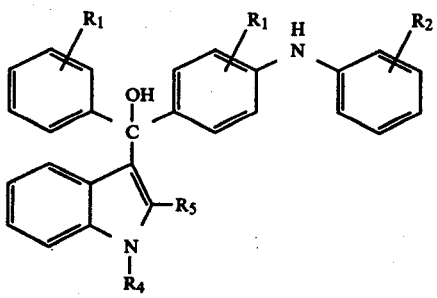

or of the formula

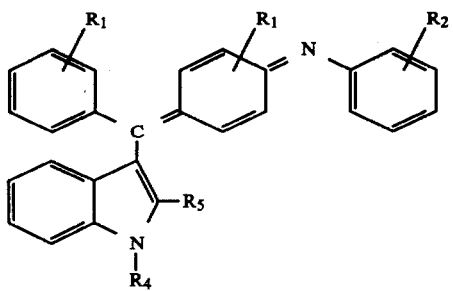

or of the formula

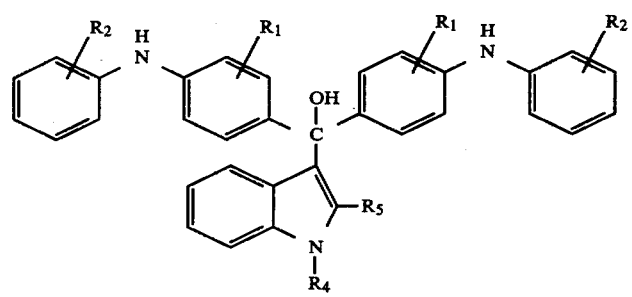

or of the formula

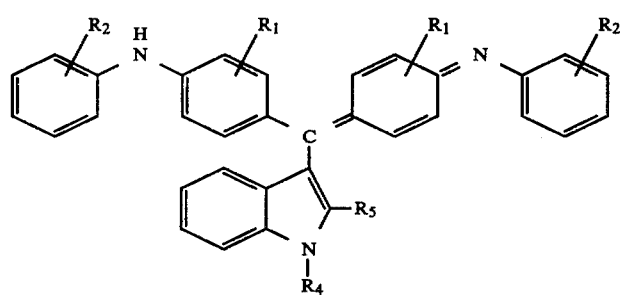

in each of which $R_1$ and $R_2$ are the same or not all the same and each is hydrogen, halogen, alkyl of from 1 to 3 carbon atoms, substituted alkyl of from 1 to 3 carbon atoms, alkoxy of from 1 to 3 carbon atoms or substituted alkoxy of from 1 to 3 carbon atoms, or one or both of $R_1$ and $R_2$ are substituted twice into one or more of the benzene rings to which they are linked, or said two substituents in any one or more benzene rings together with their respective ring are bonded to one another to form a naphthalene radical or substituted naphthalene radical, $R_4$ is hydrogen, alkyl of from 1 to 6 carbon atoms, aryl or substituted aryl; and $R_5$ is hydrogen, alkyl of from 1 to 4 carbon atoms or aryl.

5. The process as in claim 1, wherein the dyestuff base is a xanthene compound of the formula

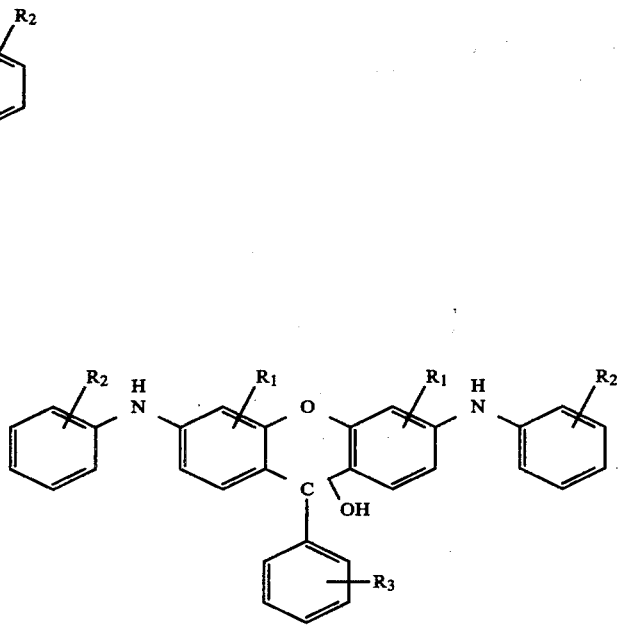

or of the formula

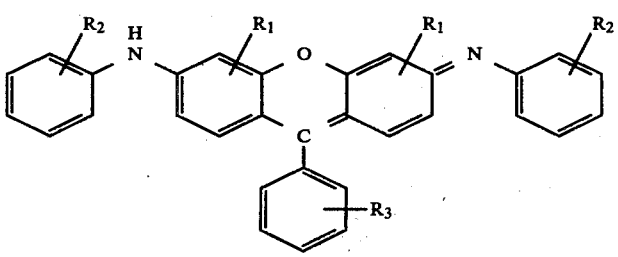

in each of which $R_1$, $R_2$ and $R_3$ are the same or not all the same and each is hydrogen, halogen, alkyl of from 1 to 3 carbon atoms, substituted alkyl of from 1 to 3 carbon atoms, alkoxy of from 1 to 3 carbon atoms or substituted alkoxy of from 1 to 3 carbon atoms, or $R_3$ is amino in the p-position relative to the central carbon atom, or one or both of $R_1$ and $R_2$ are substituted twice into one or more of the benzene rings to which they are linked, or said two substituents in any one or more benzene rings together with their respective ring are bonded to one another to form a naphthalene radical or substituted naphthalene radical.

6. The process as claimed in claim 1, wherein the dyestuff base is an oxazine compound of the formula

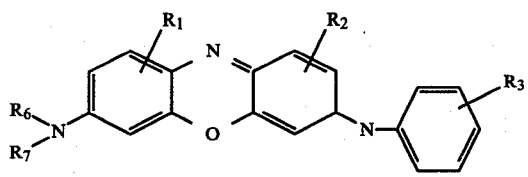

in each of which $R_1$, $R_2$ and $R_3$ are the same or not all the same and each is hydrogen, halogen, alkyl of from 1 to 3 carbon atoms, substituted alkyl of from 1 to 3 carbon atoms, alkoxy of from 1 to 3 carbon atoms or substituted alkoxy of from 1 to 3 carbon atoms, or $R_3$ is amino in the p-position relative to the central carbon atom, or one or both of $R_1$ and $R_2$ are substituted twice into one or more of the benzene rings to which they are linked, or said two substituents in any one or more benzene rings together with their respective ring are bonded to one another to form a naphthalene radical or substituted naphthalene radical, and $R_6$ and $R_7$ are identical or different and each is hydrogen, alkyl of from 1 to 6 carbon atoms, aryl, substituted aryl, aralkyl or substituted aralkyl.

7. The process as claimed in claim 1, wherein the dyestuff base is an azine compound of the formula

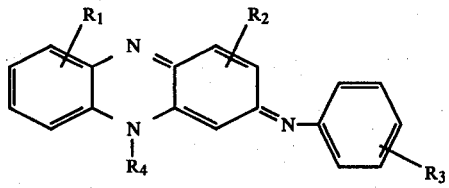

or of the formula

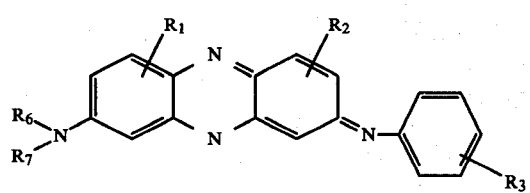

in each of which $R_1$, $R_2$ and $R_3$ are the same or not all the same and each is hydrogen, halogen, alkyl of from 1 to 3 carbon atoms, substituted alkyl of from 1 to 3 carbon atoms, alkoxy of from 1 to 3 carbon atoms or substituted alkoxy of from 1 to 3 carbon atoms, or $R_3$ is amino in the p-position relative to the central carbon atom, or one or both of $R_1$ and $R_2$ are substituted twice into one or more of the benzene rings to which they are linked, or said two substituents in any one or more benzene rings together with their respective ring are bonded to one another to form a naphthalene radical or substituted naphthalene radical, $R_4$ is hydrogen, alkyl of from 1 to 6 carbon atoms, aryl or substituted aryl, and $R_6$ and $R_7$ are the same or not the same and each is hydrogen, alkyl of from 1 to 6 carbon atoms, aryl, substituted aryl, aralkyl or substituted aralkyl.

8. A process as claimed in claim 1, which comprises dyeing with a solution of a mixture of said carbinol bases, or of said anhydro bases, or of anhydro and carbinol bases.

9. The process as claimed in claim 1, wherein mixtures of these carbinol bases or anhydro bases are used conjointly with free dyestuff bases of different structures.

* * * * *